US007398617B2

(12) United States Patent
Mattox

(10) Patent No.: US 7,398,617 B2
(45) Date of Patent: Jul. 15, 2008

(54) METHOD AND APPARATUS FOR DEPLOYING AN ANIMAL RESTRAINING NET

(76) Inventor: Harry Mattox, W239 S5850 Highway 164, Waukesha, WI (US) 53189

( * ) Notice: Subject to any disclaimer, the term of this patent is extended or adjusted under 35 U.S.C. 154(b) by 0 days.

(21) Appl. No.: 11/045,960

(22) Filed: Jan. 28, 2005

(65) Prior Publication Data

US 2005/0166441 A1 Aug. 4, 2005

Related U.S. Application Data

(60) Provisional application No. 60/540,449, filed on Jan. 30, 2004.

(51) Int. Cl.
*A01M 1/10* (2006.01)
(52) U.S. Cl. .......................................................... 43/58
(58) Field of Classification Search .................. 43/59, 43/63; 42/105, 106, 77
See application file for complete search history.

(56) References Cited

U.S. PATENT DOCUMENTS

| | | | | |
|---|---|---|---|---|
| 2,359,032 A | * | 9/1944 | Gott | 89/41.15 |
| 2,723,481 A | * | 11/1955 | Schwartz, Sr. | 43/7 |
| 3,613,282 A | * | 10/1971 | Ramsay | 42/17 |
| 4,253,132 A | * | 2/1981 | Cover | 361/232 |
| 4,256,013 A | * | 3/1981 | Quitadama | 89/41.05 |
| 4,493,395 A | * | 1/1985 | Rittenhouse | 182/187 |
| 4,559,737 A | * | 12/1985 | Washington | 43/59 |
| 4,718,187 A | * | 1/1988 | Blake | 42/84 |
| 4,912,869 A | | 4/1990 | Govett | |
| 4,939,977 A | * | 7/1990 | Stroup | 89/14.4 |
| 5,898,125 A | * | 4/1999 | Mangolds et al. | 102/439 |
| 6,325,015 B1 | * | 12/2001 | Garcia et al. | 114/382 |
| 6,539,661 B2 | * | 4/2003 | Hope | 42/119 |
| 6,854,374 B1 | * | 2/2005 | Breazeale | 86/50 |

* cited by examiner

*Primary Examiner*—Kimberly S Smith
(74) *Attorney, Agent, or Firm*—Joseph S. Heino; Partick M. Bergin

(57) ABSTRACT

An apparatus and method uses a central firing chamber, a plurality of pipes extending outwardly and slightly downwardly from the central firing chamber, means for actuating an explosive charge within the central firing chamber, a deployable net, and a plurality of net-anchoring weights attached to the perimeter of the net, each weight being releasably retained within a pipe until the explosive charge is detonated thereby deploying a net downwardly to live-capture an animal situated below the apparatus.

20 Claims, 6 Drawing Sheets

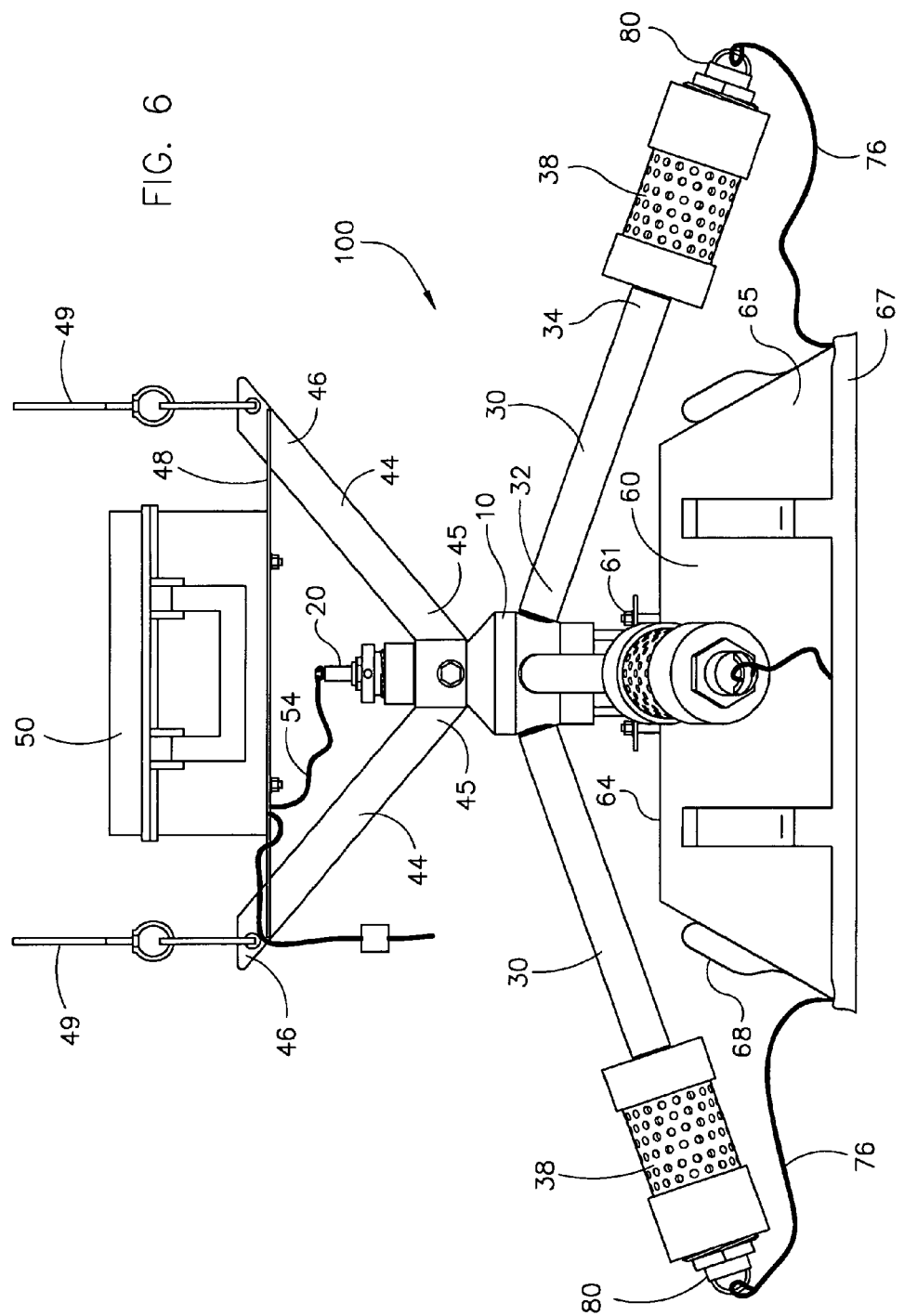

METHOD AND APPARATUS FOR DEPLOYING AN ANIMAL RESTRAINING NET

This application claims the benefit of U.S. Provisional Application Ser. No. 60/540,449 filed Jan. 30, 2004.

FIELD OF THE INVENTION

This invention relates generally to the fields of nets and net deployment. It also relates generally the fields of explosive charges and cases for such charges. More particularly, it relates to a method and apparatus for deploying a live capture net in close proximity to wild animals, such as deer, in a way that is safe for the animal, the user and any person or property that might be in the area where the apparatus is used.

BACKGROUND OF THE INVENTION

The presence of large, wild foraging animals in urban or suburban areas is a common problem. As such animals become more used to the idea of living in close proximity to man and his encroachments, large animals such as deer frequently wander into areas where there is the perceived need to destroy the animals or relocate them. Many suburban areas today engage the services of sharpshooters to partially accomplish this task. This activity is essentially a waiting game for the marksman who must patiently wait his next target, and a moderately dangerous one at that. Being the animal loving creatures that people are, relocation is favored over destruction of these wayward animals. Live catching such large animals is not, however, an easy task. Though courageous enough to enter man's domain, the animals are not so unwary as to be careful of anything that is out of place. In the experience of this inventor, any type of live catch device that could be employed of necessity is required to be configured such that it does not stand out in the animal's sensory field. It must also be able to quickly deploy the catch mechanism without allowing the animal to flee before in can be caught. It must be able to be deployed from a distance so as not to require the user to be in close proximity to the device and elude detection by the animal. It must also be easily usable, and it must be reusable.

Therefore, it is desirable to have a live catch device that is configured and used in such a fashion that it does not stand out in the animal's sensory field, visual or otherwise, and is not easily detected by the animal. It is also desirable to have a live catch device that can be quickly deployed without allowing the animal to flee before in can be caught. It is also desirable to have such a live catch device that can be deployed from a distance so as not to require the user to be in close proximity to the device and to the animal to be caught. Perhaps most importantly is the need to configure such a device that is easily usable, and that is reusable in the same or other locations.

SUMMARY OF THE INVENTION

Having the foregoing objectives in mind, the present invention relates to a method and apparatus for deploying a live capture net in close proximity to wild animals, such as deer, in a way that is safe for the animal, the user and any person or property that might be in the area where the apparatus is used. The apparatus of the present invention includes, generally, a central firing chamber, a plurality of pipes extending outwardly from the central firing chamber, means for actuating an explosive charge within the central firing chamber, a deployable net, and a plurality of net-anchoring weights attached to the perimeter of the net.

In the preferred embodiment of the apparatus, the central firing chamber is supported within a frame. The frame can be suspended, for example, between two trees by a rope or cable and high enough to be out of the animal's immediate visual field. Also attached to the frame is a remotely actuated electronic circuit having a battery, chargable capacitor or other source of stored electrical energy. The net is foldably contained within a net-holding cavity situated below the central firing chamber. At the perimeter of the net, several net-anchoring weights are attachable. One net-anchoring weight is removably secured within each of the tubes that extend from the central firing chamber. When an explosive is detonated within the central firing chamber, the explosive gases also expand into the tubes, thereby explosively discharging the net-anchoring weights from the tubes. As the net-anchoring weights are discharged away from the tubes, the net is deployed from the net-holding cavity. In this fashion, the net is, almost immediately, dispersed above and around the animal to be caught.

The foregoing and other features of the method and apparatus of the present invention will be apparent from the detailed description that follows.

BRIEF DESCRIPTION OF THE DRAWINGS

FIG. 6 is a front elevational view of the apparatus.

DETAILED DESCRIPTION

Figure 2:
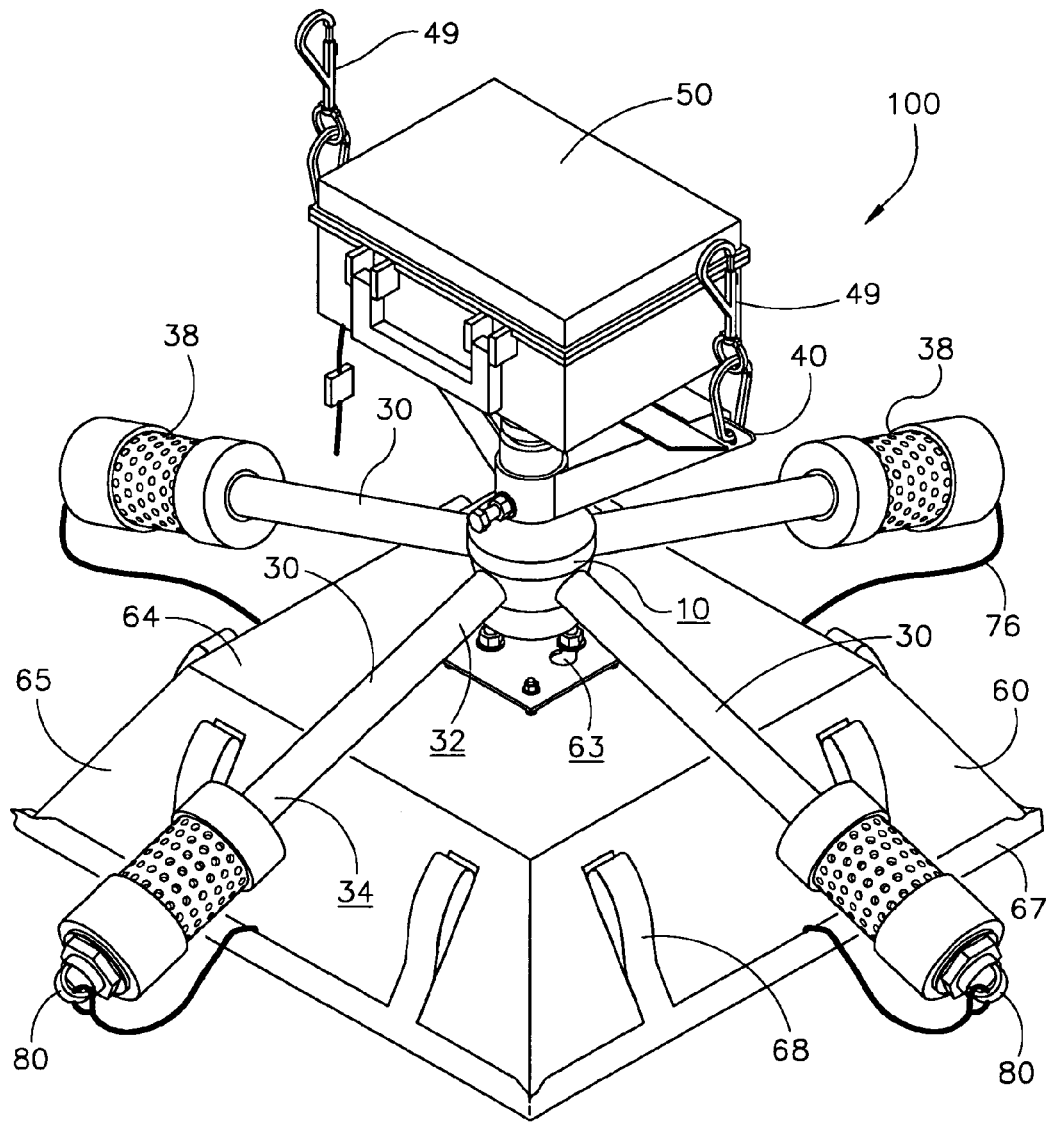
FIG. 2 is an enlarged top, front and right side perspective view of the apparatus shown in FIG. 1.

Referring now to the drawings in detail, wherein like numbers represent like elements throughout, FIG. 2 illustrates an apparatus, generally identified 100, constructed in accordance with the present invention. As shown, the apparatus 100 includes a centrally located firing chamber member 10. The firing chamber member 10 includes an upper chamber portion 12 and a lower chamber portion 14. See FIG. 5. In the preferred embodiment, the upper chamber portion 12 is integrally formed with the lower chamber portion 14. It would, however, be possible to construct the firing chamber member 10 in such a fashion that the upper and lower chamber portions 12, 14, respectively, would be threadably attachable or secured in some other fashion without deviating from the scope of this invention.

Figure 4:
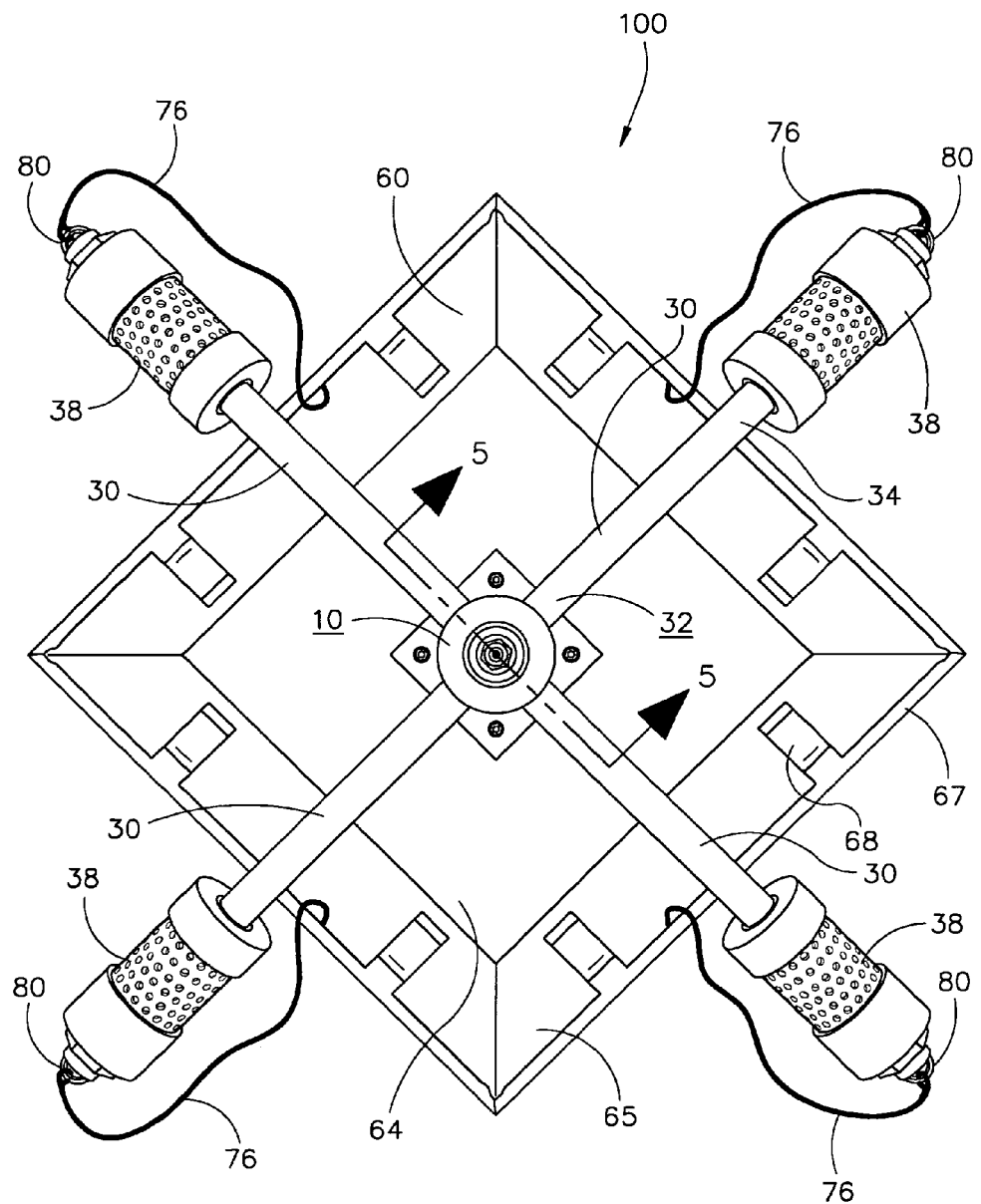
FIG. 4 is a partial top plan view of the apparatus.
Figure 5:
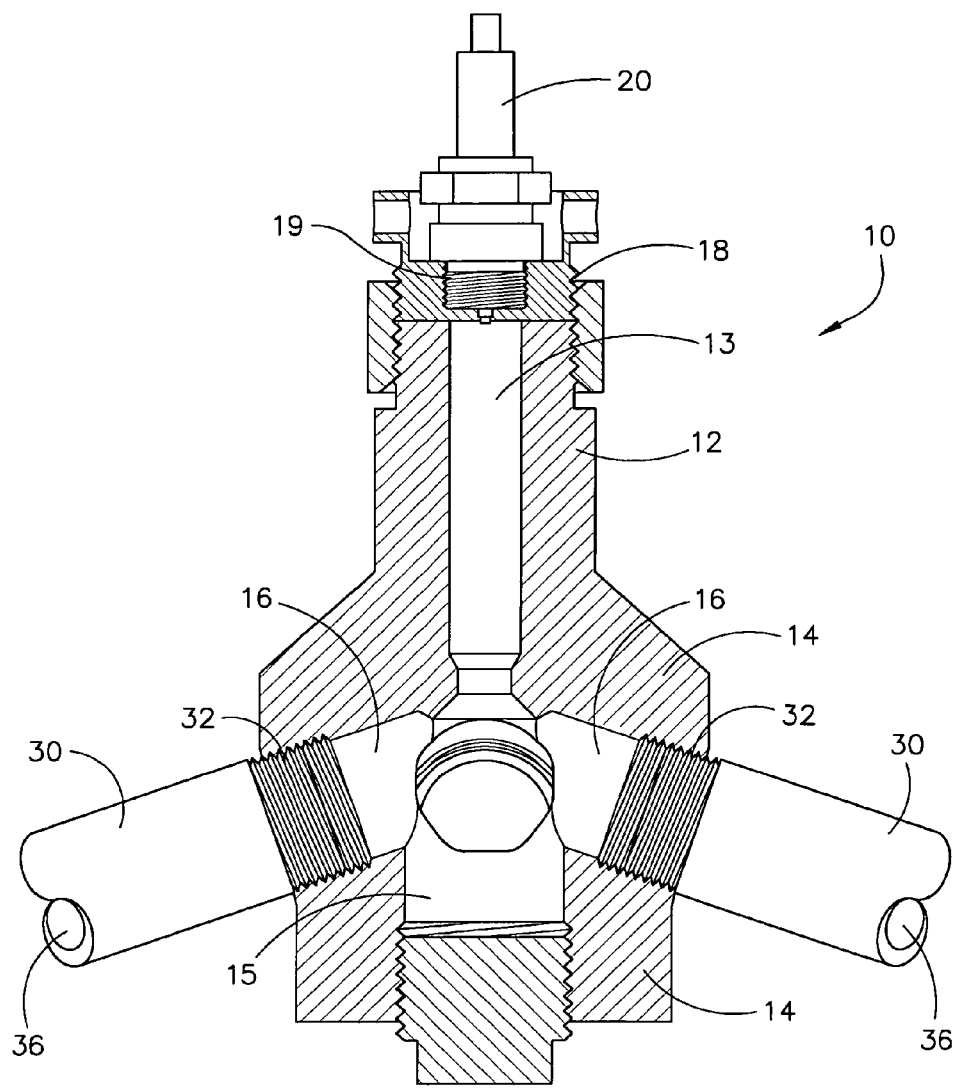
FIG. 5 is an enlarged cross sectional and partial side elevational view of the firing chamber portion of the apparatus taken along line 5-5 in FIG. 4.

The upper chamber 12 includes a bore 13, the bore 13 having an axis that is aligned generally vertically. The bore 13 is functionally adapted to receive an explosive (not shown) of some sort within it, such explosive including a shell or cartridge and the type of shell or cartridge not being a limitation of this device. The lower chamber portion 14 includes a primary bore 15, the primary bore 15 having an axis that is also aligned generally vertically, a plurality of secondary bores 16. The secondary bores 16 of the preferred embodiment are four in number and are disposed at 90° relative to one another. See FIG. 4. As shown in FIG. 5, the secondary bores 16 extend generally outwardly from the axis of the lower chamber portion 14 and slightly downwardly from the horizontal. In the preferred embodiment, the axis of each secondary bore 16 extends downwardly at an angle of 22½° below the horizontal. The bore 13 of the upper chamber portion 12 and the primary and secondary bores 15, 16, respectively, of the lower chamber portion 14, are each connected to one another to form a bore continuum, the purpose of which will be apparent later in this detailed description.

Threadably attached to the upper chamber portion is a spark plug holder 18, the holder 18 having a bore 19 defined within it and the axis of the bore 19 being aligned generally vertically. Threadably inserted within the bore 19 of the spark plug holder 18 is a spark plug 20. Here again, the configuration of the spark plug holder 18 and its attachment means is not a limitation of the present invention. It is also to be understood that the means for discharging an explosive (not shown) that is placed within the bore 13 may be mechanical or electromechanical as well as well as electrical without deviating from the scope of this invention. For example, an electronic primer could be used to impart a mechanical trigger to a shell or cartridge for detonation.

Referring again to FIG. 2, it will be seen that the apparatus 100 of the present invention also includes a plurality of pipes 30, each pipe 30 having a first end 32, a second end 34 and a central bore 36. See also FIGS. 5 and 6. The first end 32 of each pipe 30 is threadably received by one of the secondary bores 16 of the lower chamber portion 14. The central bore 36 of each pipe 30 is continuous with the primary bore 15 of the lower chamber portion 14. Because of the angle of the secondary bores 16 of the lower chamber portion 14, each pipe 30 extends outwardly and slightly downwardly from the horizontal relative to the lower chamber portion 14. Situated at the second end 34 of each pipe 30 is a muffler 38. While not absolutely necessary to the function of the apparatus 100, the purpose of the muffler 38 is to muffle the volume of an explosion that will emanate from the bore 13 of the upper chamber portion and the primary bore 15 of the lower chamber portion 14.

Figure 3:
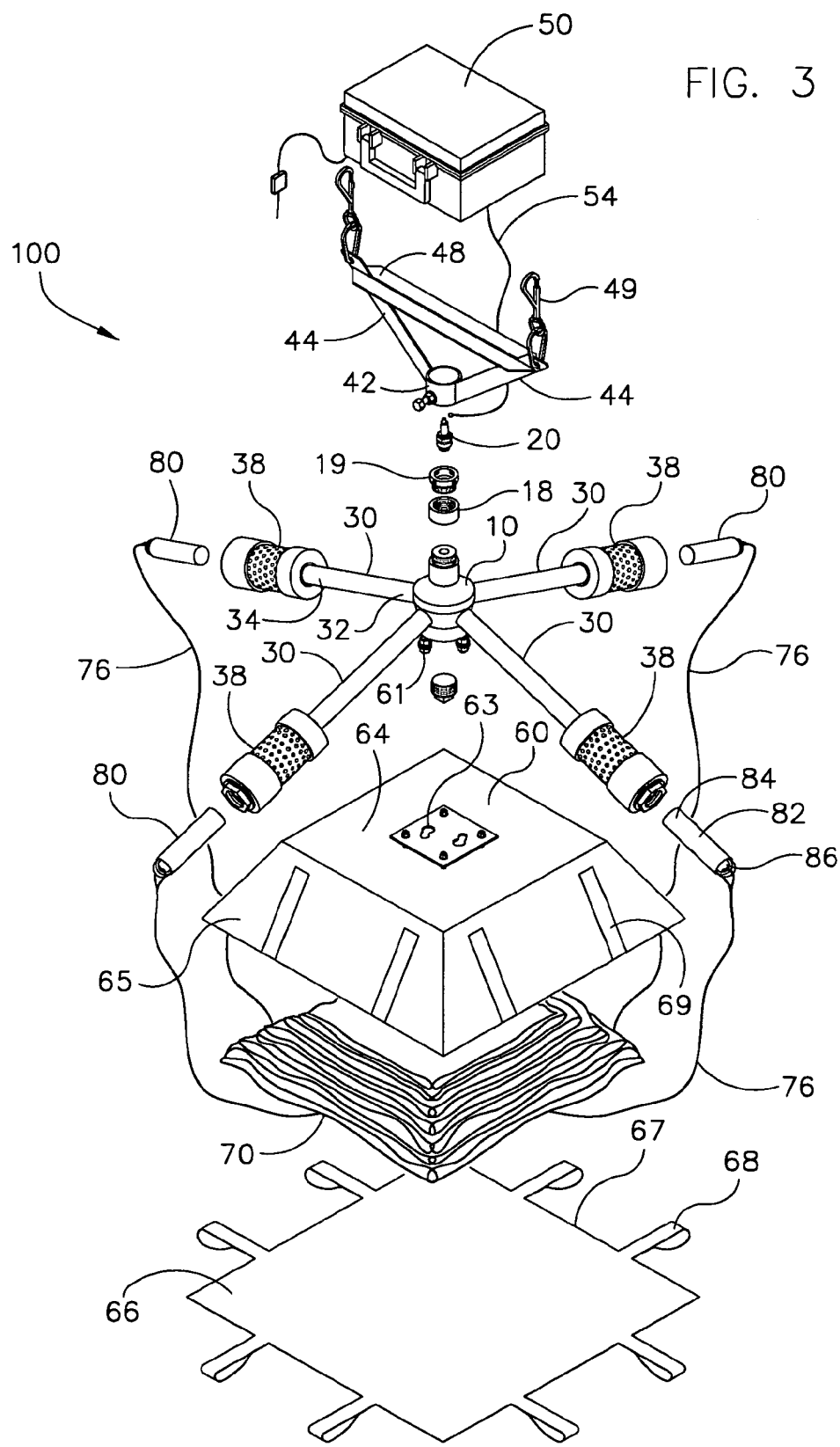
FIG. 3 is a slightly reduced and exploded view of the apparatus, similar to that shown in FIG. 2.

In the preferred embodiment, a frame 40 is attachable to the upper chamber portion 12. See FIGS. 3 and 6. The frame 40 includes a cylindrical sleeve 42. A pair of support legs 44 is provided, each leg 44 having a first end 45 and a second end 46. The first end 45 of each support leg 44 is attached to an opposing side of the cylindrical sleeve 42. Each support leg 44 extends upwardly and outwardly from the sleeve 42. A support bridge 48 extends generally horizontally between the second ends 46 of the support legs 44. Also attached to each of the second ends 46 of the support legs 44 is a suspension clip assembly 49. As shown, the suspension clip assembly 49 is configured from a carabiner and clip used in combination, although many other configurations could be devised to accomplish the intended purpose which is to suspend the assembly 100 above the ground. Accordingly, the configuration shown is not a limitation of the present invention.

Figure 1:
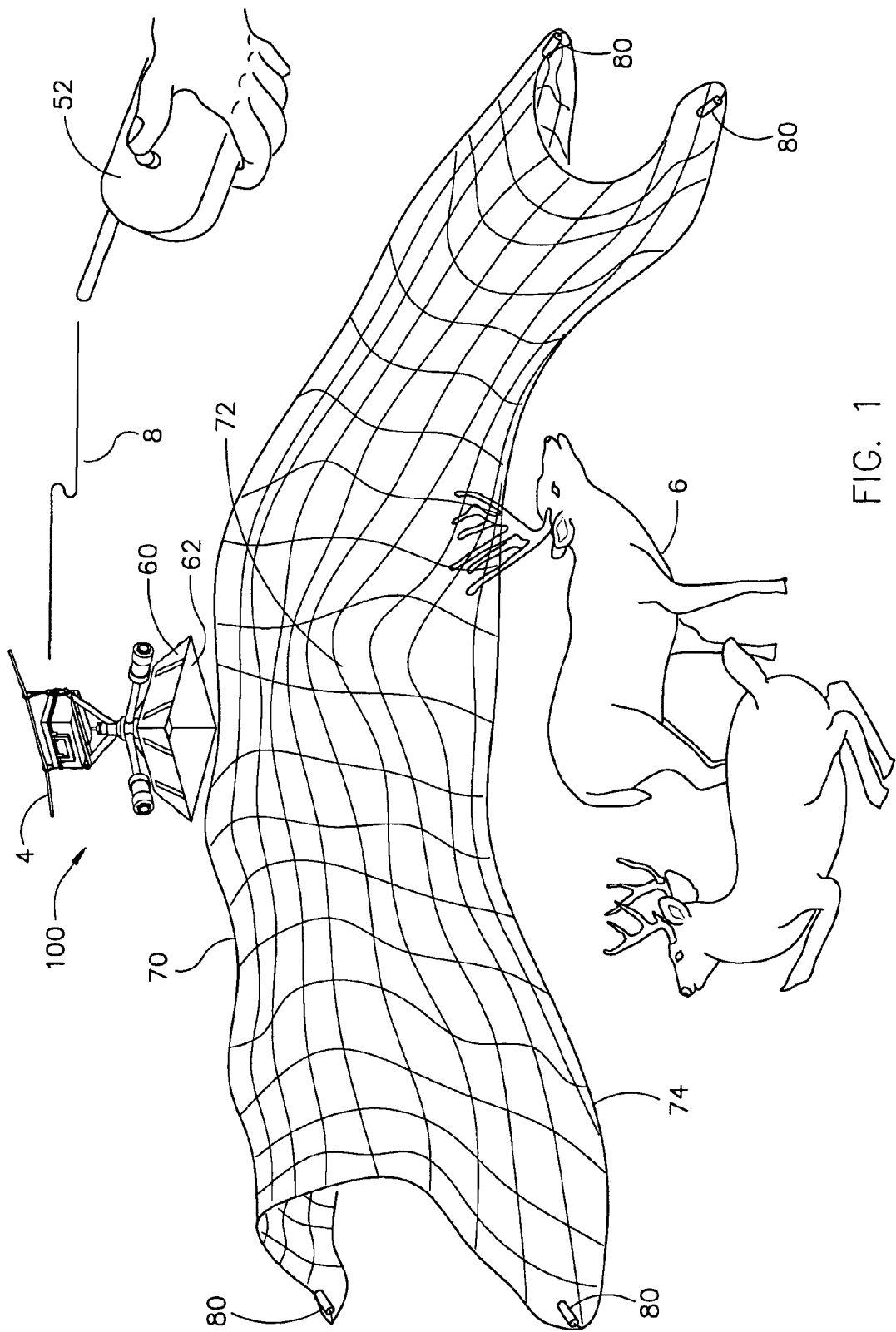
FIG. 1 is a perspective view of an apparatus constructed in accordance with the present invention and showing deployment of a net as intended.

An electronics component box 50 is secured atop the support bridge 48 of the frame 40. Though not shown in any detail, the electronics component box contains an electromagnetic wave receiver circuit and a stored electrical energy device, such as a battery. In the preferred embodiment, the receiver circuit is actuated remotely by means of a remote control transmitter 52. See FIG. 1. A wire 54 extends from the box 50 to the spark plug 20 for energizing the plug 20 when such is desired or required. Here again, it is to be understood that the transmitter 52 could actuate a mechanical trigger or an electromechanical trigger (not shown) by creating mechanical motion through the electromagnetic forces exerted on the trigger by use of a solenoid, for example. As alluded to earlier, the precise form of shell or cartridge used and the precise form of detonation, by electrical or mechanical means, is not a limitation of the present invention or device.

A net-holding cavity 62 is formed by a net-holding box 60. See FIGS. 2, 3 and 6. The net-holding box 60 is secured to the bottommost portion of the firing chamber member 10. The net-holding box 60 includes a top box portion 64 and a plurality of sidewalls 65 extending outwardly and downwardly from the top portion 64. The top box portion 64 is secured to the firing chamber member 10 by means of a pair of fasteners 61. The top box portion 64 includes a pair of slots 63 through which the heads of the fasteners 61 may extend. In this fashion, the net-holding box 60 may be removed by a slight twisting motion for ease in replacing the net 70 within the net-holding cavity 62. In this preferred embodiment, and because the box 60 is inverted, the net 70 is held in place within the net-holding cavity 62 by means of a removable cover 66. At the edges 67 of the cover 66 are attached a plurality of Velcro® type fasteners 68. Complementary fasteners 69 are attached to the sidewalls 65 of the box 60.

As alluded to above, the net 70 is foldably contained within the net-holding box 62. See FIG. 3. The net 70 includes a central net portion 72 and a net perimeter 74. See FIG. 1. A plurality of net-anchoring weights 80 are attached to the net perimeter 74 by means of net strings 76. Refer again to FIGS. 2, 3 and 6. Each weight 80 includes a cylindrically-shaped body 82 having a first end 84 and a second end 86. The first end 84 of each weight 80 is attached to a portion of the net perimeter 74. The second end 86 of each weight 80 is insertable within the bore 36 of one of the pipes 30.

In application, the net 70 is foldably inserted within the cavity 62 of the net-holding box 60. The cover 66 is secured using the cover fasteners 68, 69. One weight 80 is inserted within the bore 36 of each pipe 30. A charge (not shown) is inserted within the bore 13 of the upper chamber portion 12. The spark plug holder 18, with the spark plug 20 in place, is attached to the upper chamber portion 12. The complete apparatus 100 is then ready for suspension. It is to be understood that the apparatus 100 could be suspended between two trees, or any other vertically extending objects, by means of a cable 4 that extends between them and by means of the frame clip assemblies 49. See FIG. 1. The user then moves to a remote location that is within the user's visual range and within range of the transmitter 52 that will be used to actuate the electronic receiver contained within the electronics box 50.

As an animal 6 moves into position immediately below the suspended apparatus 100, the user actuates the transmitter 52 to send an electromagnetic wave signal 8 to the receiver circuit which, in turn, actuates the receiver and sends a charge to the spark plug 20 via the wire 54. As the spark plug 20 energizes, an explosive (not shown) contained within the bore or chamber 13 explodes, thereby releasing explosive gases into the bores 15, 16. Almost instantaneously, these gases expand into the tubes 30, thereby explosively discharging the net-anchoring weights 80 from within the tubes 30. As the net-anchoring weights 80 are discharged away from the tubes 30, pulling and deploying the net 70 from the net-holding cavity 62 via the net strings 76 and detaching the net cover 66 from the fasteners 68, 69. In this fashion, the net 70 is, almost immediately, dispersed above and around the animal 6 to be caught. After the animal 6 is removed from the net 70 and successfully relocated, the net 70 may be re-folded and stored within the net-holding box 60 for re-use, the net 70 being secured by means of the cover 66. The weights 80 may be re-inserted into the tubes 30 and the spent explosive is replaced. The apparatus 100 is then ready for re-use.

Based on the foregoing, it will be seen that there has been provided a new and useful live catch device that is configured and used in such a fashion that it does not stand out in the animal's sensory field, visual or otherwise, and is not easily detected by the animal; that can be quickly deployed without allowing the animal to flee before in can be caught; that can be deployed from a distance so as not to require the user to be in close proximity to the device and to the animal to be caught; and that is easily usable, and is reusable in the same or other locations.

Although the invention has been described in considerable detail through the figures and above discussion, many variations and modifications can be made by one skilled in the art without departing from the spirit and scope of the invention.

The principles of this invention having been described in accordance with the foregoing, I claim as my invention:

1. An apparatus for remotely deploying a live capture net in close proximity to wild animals in a way that is safe for the animal, the user and any person or property that might be in the area where the apparatus is used, which comprises
   a frame,
   a suspension assembly for suspending the frame at a point above the ground that positions the frame high enough to be out of the animal's immediate visual field,
   a firing chamber member, the firing chamber member being supported within the frame and the firing chamber comprising a primary bore and a plurality of secondary bores,
   a spark plug holder positioned within the primary bore of the firing chamber member,
   a spark plug,
   an explosive placed within the primary bore of the firing chamber member, the explosive being detonated by electrical actuation of the spark plug,
   a plurality of pipes extending downwardly and outwardly from the firing chamber member, each pipe defining a pipe bore and each of said pipe bores forming a bore continuum with the secondary bore of the firing chamber member,
   a deployable net, the net defining a net perimeter, and
   a plurality of net-anchoring weights attached to the perimeter of the net, each weight being receivable within the bore of a pipe for discharge of the weight from the pipe bore,
   wherein one net-anchoring weight is removably secured within each of the pipe bores that extend from the firing chamber member until deployed which, when the plurality of weights is deployed, also deploys the net and the net perimeter in a generally outwardly and generally downwardly direction to live capture an animal positioned below the frame within the net.

2. The apparatus of claim 1 further comprising a remotely actuated electronic circuit having a source of stored electrical energy for actuating the spark plug.

3. The apparatus of claim 2 further comprising an electromagnetic wave receiver circuit and a remote control electromagnetic wave transmitter, the receiver circuit being actuated by the remote control transmitter to initiate actuation of the spark plug.

4. The apparatus of claim 1 wherein the explosive is contained within a shell or cartridge that is placed within the primary bore of the firing chamber.

5. The apparatus of claim 4 further comprising an electronic primer wherein the shell or cartridge is detonated by the electronic primer.

6. The apparatus of claim 1 further comprising a box having a net-holding cavity, the cavity being formed to house the net within it prior to deployment of the net, and a removable box cover.

7. The apparatus of claim 6 wherein the box comprises a plurality of box sidewall and sidewall edges and the box cover comprises a plurality of box cover edges and wherein a plurality of hook and loop type fasteners are attached to the box sidewall edges and a plurality of complementary hook and loop type fasteners are attached to the box cover edges.

8. The apparatus of claim 1 wherein each pipe comprises a first end that is proximal to the firing chamber member and a second end that is distal to the firing chamber member, the apparatus further comprising a muffler that is disposed at the distal end of each pipe.

9. The apparatus of claim 1 wherein the plurality of pipes is comprised of four pipes, each disposed outwardly 90° radially from the next adjacent bore and downwardly at an angle of 22½° below the horizontal.

10. The apparatus of claim 1 wherein the suspension assembly comprises a suspension clip assembly having a carabiner and clip used in combination, wherein the clip being attachable to an object above the ground.

11. A method for remotely deploying a live capture net in close proximity to wild animals in a way that is safe for the animal, the user and any person or property that might be in the area where the apparatus is used, which comprises the steps of
    providing a frame,
    providing a suspension assembly for suspending the frame at a point above the ground that positions the frame high enough to be out of the animal's immediate visual field,
    providing a firing chamber member, the firing chamber member being supported within the frame and the firing chamber comprising a primary bore and a plurality of secondary bores,
    providing a spark plug holder positioned within the primary bore of the firing chamber member,
    providing a spark plug,
    providing an explosive within the primary bore of the firing chamber member, the explosive being detonated by electrical actuation of the spark plug,
    providing a plurality of pipes extending downwardly and outwardly from the firing chamber member, each pipe defining a pipe bore and each of said pipe bores forming a bore continuum with the secondary bore of the firing chamber member,
    providing a deployable net, the net defining a net perimeter,
    providing a plurality of net-anchoring weights attached to the perimeter of the net, each night being receivable within the bore of a pipe for discharge of the weight from the pipe bore, and
    electrically actuating the spark plug,
    wherein one net-anchoring weight is removably secured within each of the pipe bores that extend from the firing chamber member until deployed which, when the plurality of weights is deployed, also deploys the net and the net perimeter in a generally outwardly and generally downwardly direction to live capture an animal positioned below the frame within the net.

12. The method of claim 11 further comprising the step of providing a remotely actuated electronic circuit having a source of stored electrical energy for actuating the spark plug.

13. The method of claim 12 further comprising the steps of providing an electromagnetic wave receiver circuit and a remote control electromagnetic wave transmitter, the receiver circuit being actuated by the remote control transmitter to initiate actuation of the spark plug.

14. The method of claim 11 wherein the explosive is contained within a shell or cartridge that is placed within the primary bore of the firing chamber.

15. The method of claim 14 further comprising the steps of providing an electronic primer wherein the shell or cartridge is detonated by the electronic primer.

16. The method of claim 11 further comprising the steps of providing a box having a net-holding cavity, the cavity being formed to house the net within it prior to deployment of the net, and a removable box cover.

17. The method of claim 16 wherein the box providing steps comprises providing a plurality of box sidewall and sidewall edges and the box cover providing step comprises providing a plurality of box cover edges and further comprising the step of attaching a plurality of hook and loop type fasteners to the box sidewall edges and a plurality of complementary hook and loop type fasteners to the box cover edges.

18. The method of claim 11 wherein each pipe comprises a first end that is proximal to the firing chamber member and a second end that is distal to the firing chamber member, the method further comprising the steps of providing a muffler that is disposed at the distal end of each pipe.

19. The method of claim 11 wherein the plurality of pipes is comprised of four pipes, each disposed outwardly 90° radially from the next adjacent bore and downwardly at an angle of 22½° below the horizontal.

20. The method of claim 11 wherein the suspension assembly providing step comprises providing a suspension clip assembly having a carabiner and clip used in combination and further comprising the step of attaching the clip to an object above the ground.

* * * * *